United States Patent [19]

Angus

[11] Patent Number: 4,989,653
[45] Date of Patent: Feb. 5, 1991

[54] EDGING APPARATUS

[76] Inventor: Philip A. Angus, 516 Morrow Ave., Carnegie, Pa. 15106

[21] Appl. No.: 485,346

[22] Filed: Feb. 26, 1990

[51] Int. Cl.⁵ .............................................. B27C 1/00
[52] U.S. Cl. .................................. 144/117 B; 144/130; 144/134 R; 144/246 D; 144/246 E; 144/247; 144/253 R; 409/138; 409/163
[58] Field of Search ........... 144/114 R, 117 R, 117 B, 144/130, 134 R, 246 R, 246 D, 246 E, 247, 253 R, 253 H, 253 J, 253 B, 248; 409/138, 139, 145, 163

[56] References Cited

U.S. PATENT DOCUMENTS

| | | | |
|---|---|---|---|
| 2,414,574 | 1/1947 | Williams | 409/163 |
| 2,613,706 | 10/1952 | Smith | 144/248 |
| 2,782,817 | 2/1957 | Steiner | 144/117 B |
| 2,998,040 | 8/1961 | Patterson | 144/117 B |
| 4,364,696 | 12/1982 | Syarte et al. | 409/138 |
| 4,655,268 | 4/1987 | Lundblom | 409/163 |
| 4,787,112 | 11/1988 | Gebhardt et al. | 409/138 |

FOREIGN PATENT DOCUMENTS

| | | | |
|---|---|---|---|
| 107817 | 6/1984 | Japan | 409/138 |
| 169208 | 7/1988 | Japan | 409/138 |

Primary Examiner—W. Donald Bray
Attorney, Agent, or Firm—Kirkpatrick & Lockhart

[57] ABSTRACT

An edging apparatus is provided which permits fast, efficient edging of materials, such a plexiglass, masonite or wood, on a horizontal plane. The edging apparatus includes a material support surface, a motor and cutter, a fence and an automatic feed assembly. The cutter motor is mounted on a sliding assembly to permit linear movement of the cutter.

8 Claims, 3 Drawing Sheets

FIG. I

EDGING APPARATUS

BACKGROUND OF THE INVENTION

1. Field of the Invention

The present invention relates to cutting equipment and more particularly to an apparatus for edging the ends of cut materials.

2. Description of the Prior Art

After a piece of wood, plexiglass, masonite or similar material is rough cut, the edges are typically smoothed to remove the saw marks. In woodworking, the board is run through a jointer. If further finishing is required, an edge sander may be used.

The rough cut edges of a piece of plexiglass are typically smoothed with hand tools. The edges are first scraped with a blade, then sanded with a hand held orbital sander using rough, then fine sandpaper. Manual edging is very time consuming. After the edging, the plexiglass edges are buffed on a buffing machine.

An edging machine manufactured by the Edge Finisher Corporation is commercially available for use with plexiglass. The plexiglass is automatically fed through a specially designed cutter by two drive belts at an adjustable rate of 0–18 ft./min. The spindle speed is 24,000 rpm via a 2 hp phase 60 Hz motor. Three phase electrical power is, therefore, required. The material is passed through the cutter in a vertical plane. Alignment of the piece with the machine is critical because the piece is sitting on its edge. Upright columns are provided to support larger pieces to maintain a 90° angle between the sides and edges of the material. The drive belts on the automatic feed must be adjusted for varying thicknesses of material.

An object of the present invention is to provide an edging apparatus which will significantly reduce the time required for edging as compared to that required for manual edging. A further object of the present invention is to provide an edging apparatus which is simple and inexpensive to construct and operate. Finally, it is an object of the present invention to provide an edging apparatus which promotes ease of alignment of the material to be processed.

SUMMARY OF THE INVENTION

The objects of the present invention are satisfied by an apparatus for edging material wherein the material is comprised of a rigid sheet of a predetermined range of thicknesses having at least one straight edge. The apparatus includes a material support surface, a cutter, a motor, such as a motor, for rotating the cutter and guide means for guiding and aligning material relative to the cutter when at least one straight edge of the material is abutted against the guide means. The cutter includes a longitudinal axis which lies on a plane parallel to and spaced from the plane of the support surface and a plurality of blades for rotating about the axis. Each blade has a facing edge which lies in a plane generally perpendicular to the plane of the longitudinal axis of the cutter. The guide means includes a lead portion, a take-up portion, and a window disposed between the lead and take-up portions for receiving the cutter. The lead portion has a zone adjacent the support surface stepped in relative to the take-up portion such that the zone lies in a plane parallel to but spaced from the plane of the take-up portion, and the zone and take-up portion planes are perpendicular to the plane of the support surface. The plane of the take-up portion and the plane of the facing edges of the blades of the cutter are preferably coplanar. The dimension of the space between the zone plane and the take-up portion plane is that of a predetermined depth of cut of material passed over the support surface along the guide means from the lead portion past the facing edges of the blades of the cutter to the take-up portion.

The apparatus is preferably provided with means for automatically passing material of a predetermined range of thicknesses over the support surface along the guide means. The cutter is preferably movable linearly along the line of its longitudinal axis.

BRIEF DESCRIPTION OF THE DRAWINGS

The present invention can be better understood by reference to the drawings in which.

DETAILED DESCRIPTION OF THE PREFERRED EMBODIMENT

FIGS. 1-4 illustrate the preferred embodiment of the edging apparatus 10 of the present invention. For purposes of the detailed description, the edging apparatus 10 will be described for use with plexiglass. Those skilled in the art will recognize, however, that the edging apparatus can be used to process other materials.

The materials processed in the edging apparatus 10, as used herein, refer to rigid sheet like material having generally, and preferably substantially, flat opposing faces and at least one straight edge having a thickness within a predetermined range. Materials such as plexiglass, masonite or wood are exemplary.

Figure 1:
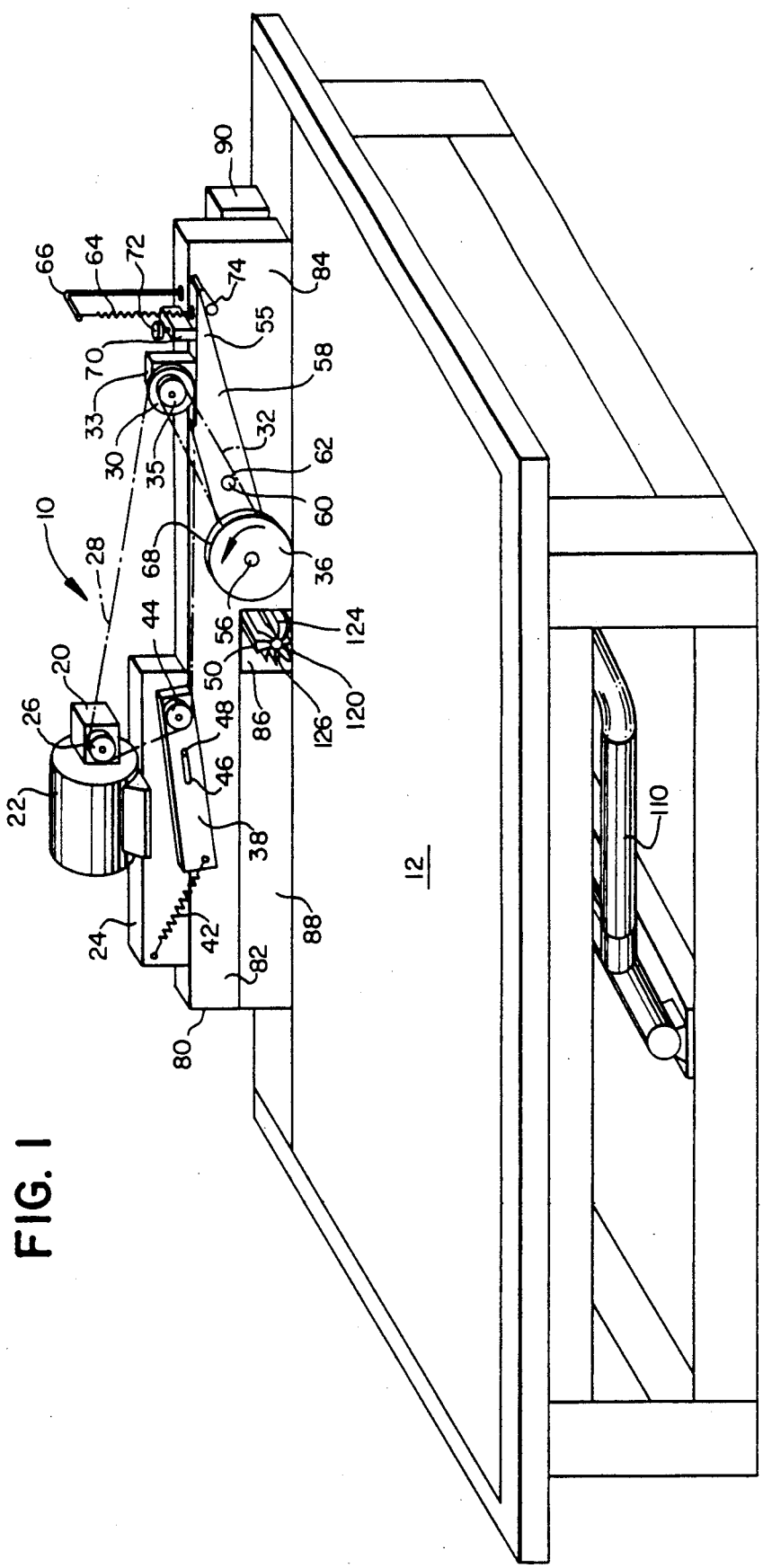
FIG. 1 is a perspective view of the edging apparatus of the present invention.

Referring to FIG. 1, the edging apparatus 10 includes generally a support surface, or table 12 and associated support frame 14, an automatic self-adjusting feed assembly 20, a fence 80, a motor assembly 40, and a cutter 50. Table 12 preferably lies in a horizontal plane and may be covered with masonite or some other smooth surface so that the plexiglass or other material can easily slide over the surface of table 12. The automatic feed assembly 20 includes a motor 22, preferably a series wound AC motor with standard built in gear reduction to control the speed of the automatic feed assembly 20. Motor 22 is mounted on support bar 24 and has attached thereto a small sprocket 26. Motor 22 preferably provides a 324:1 gear reduction from the motor output shaft to the small sprocket 26. An electronic speed control offers a range of feed speeds, preferably from about 0.5 to 1.5 inches per second.

The small sprocket 26 operatively connects motor 22 by means of chain 28, a larger sprocket 30 and its associated sprocket 35 to chain 32 and sprocket 34 to a drive wheel 36. There is a gear reduction from sprocket 26 to sprocket 30, preferably in the range of about 5–15:1. There is a further gear reduction from sprocket 30 to sprocket 34 and drive wheel 36, preferably in the range of about 5–15:1. A spring-loaded idler assembly includes bar 38, spring 42, and sprocket 44. Bar 38 includes a slot 46 and screw 48. Screw 48 and spring 42 slidably connect bar 38 to motor support bar 24. Slot 46 permits bar 38 to slide longitudinally and pivot at screw 48. Sprocket 44 takes up any slack in chain 28. A second idler block 52 and sprocket 54 are provided to take up any slack in chain 32.

Drive wheel 36 is connected by shaft 56 to one end 53 of a spring-loaded bar 58. The opposite end 55 of bar 58 is connected to a spring 64 which is suspended from spring holder 66. Spring 64 can be adjusted to maintain the desired bias on drive wheel 36. Screw 60 connects the approximate midpoint of bar 58 to fence 80 and provides a pivot point 62. Drive wheel 36 rotates about shaft 56 in a counterclockwise direction. Drive wheel 36 includes a groove for receiving an O-ring 68 around its circumference to provide a smooth, nonabrasive surface for contact with the material being processed. A stop 70 and an adjustable set screw 72 are provided to keep drive wheel 36 from rubbing against table 12. The clearance required is very slight; for example, a clearance of about 0.03 inch will suffice. A spring-loaded detent 74 extends through fence 80 and can be pushed from the back of fence 80 to extend outwardly to catch the end 55 of bar 58 to temporarily disable the automatic feed assembly 20. The detent 74 will retreat into fence 80 by lifting up on drive wheel 36. The automatic feed assembly 20 is self adjusting for various thicknesses of material within a predetermined range. A preferred range for typical plexiglass usage is from 0 to about ⅜ inch and more preferably, from about 1/16 to ⅜ inch. The range can be adjusted by extending or limiting the length of slot 46 on bar 38 and adjusting springs 42 and 64.

Fence 80, which is preferably made of cold-rolled steel, includes a lead portion 82 and a take-up portion 84. A window 86 is provided between the lead and take-up portions 82, 84 through which cutter 50 extends. Lead portion 82 has an inset section or zone 88 which is stepped in to the desired depth of cut. Zone 88 of lead portion 82 lies in a plane parallel to but spaced from the plane of take-up portion 84, and both the zone and take-up portion planes are perpedicular to the plane of table 12. A preferred dimension of the space between the planes, eg. the inset of zone 88 is about 0.005 inch. The precise dimension of the inset may vary depending upon the anticipated use of the edging apparatus 10. The end face 120 of the blades 124 of cutter 50 lies in a plane that is preferably substantially coplanar to the plane of take-up portion 84 so that a piece of plexiglass passed along lead portion 82 is cut to the depth of the inset of zone 88 and passed along take-up portion 84. For example, in the preferred embodiment having an inset of 0.005 inch, each cut removes 0.005 inch of material yielding a smooth finish on the edge which is then ready for buffing.

Figure 2:
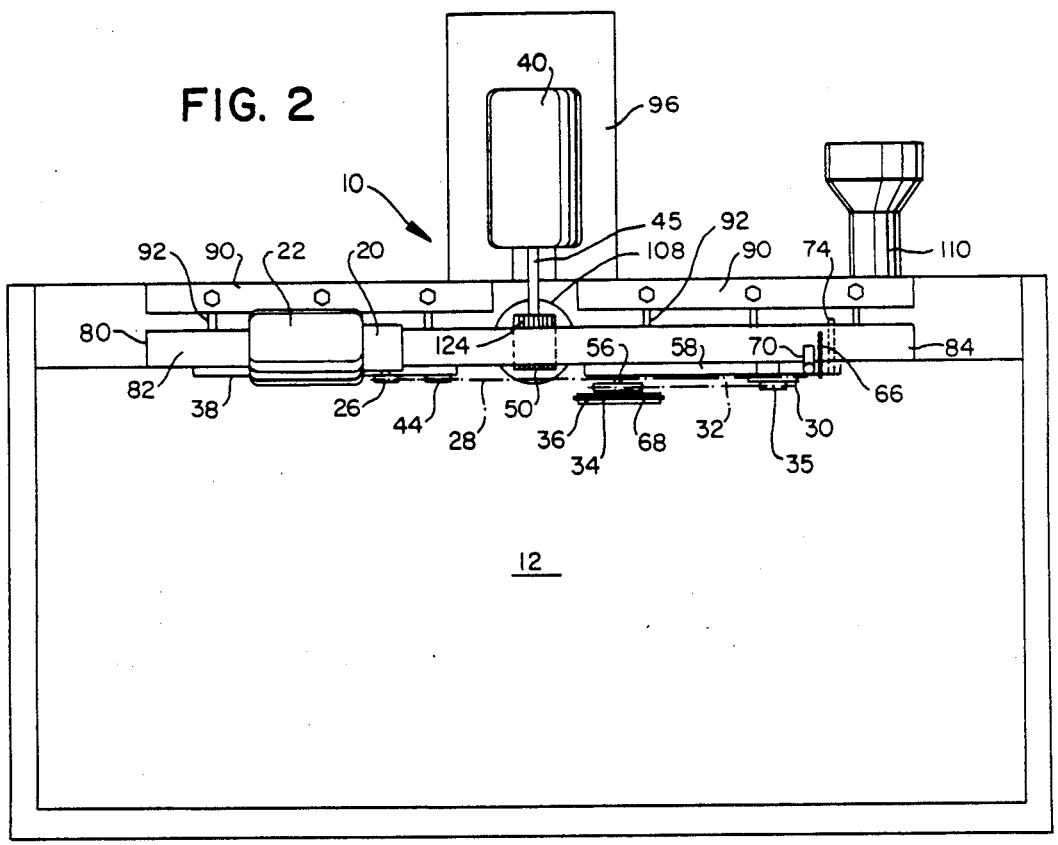
FIG. 2 is a top plan view of the edging apparatus of FIG. 1.
Figure 3:
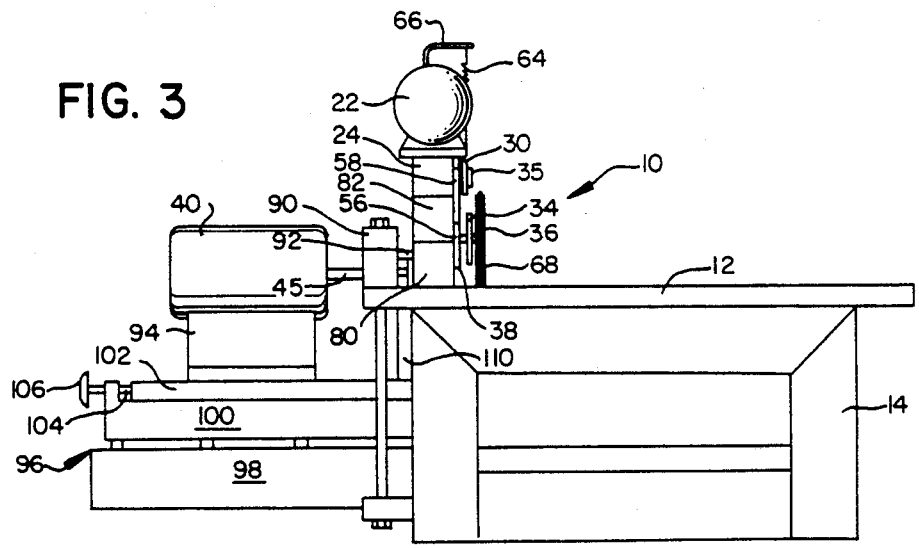
FIG. 3 is a side elevation view of the edging apparatus of FIG. 1.
Figure 4:
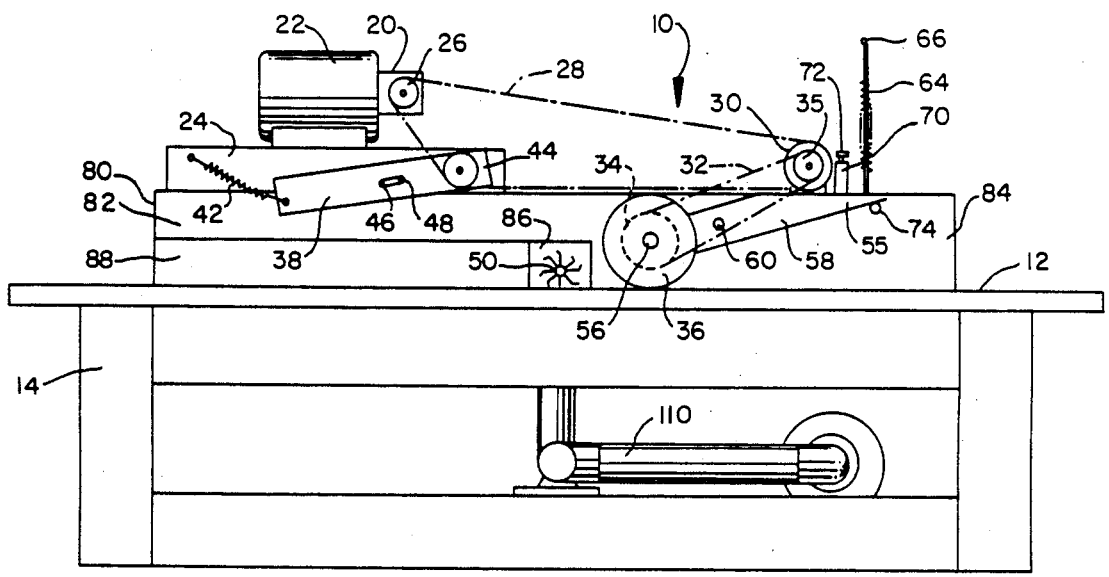
FIG. 4 is a front elevation view of the edging apparatus of FIG. 1.

Referring to FIGS. 2 and 3, fence 80 is connected to fence supports 90 by screws 92. Adjustments can be made to fence 80 by adjusting screws 92. A motor 40, which is preferably a standard 2 hp, 2800 rpm, 110 V single-phase router motor, is cradled in a motor support 94 which is positioned on a sliding assembly 96. Motor 40 includes shaft 45 on which cutter 50 is mounted. Sliding assembly 96 provides a rigid, accurate means of linear motion for moving cutter 50 back and forth as desired for adjusting the position of cutter 50 relative to fence 80 or for changing the cutter. Sliding assembly 96 may be any commercially available Vee Wayed slide similar to those used on milling machines or metal lathes. The sliding assembly 96 includes a base 98, a lower portion 100, a sliding section 102, and a screw 104 with knob 106. By turning knob 106, sliding section 102 moves longitudinally along screw 104.

Referring to FIGS. 1 and 2, cutter 50 includes a longitudinal axis 126 which is coaxial to shaft 45 of motor 40 and a plurality of blades 124 which rotate about the axis 126. Cutter 50 is preferably positioned so that the facing edges 120 of each blade 124 lie in a plane which is generally, and preferably substantially, coplanar to the plane of take-up portion 84 of fence 80. A preferred cutter 50 is a commercially available C1-1κ inch shell mill cutter.

The cutting surfaces are the faces 120. In other cutting or material processing machines, such as a shaper or a table router, a cutter of the general type employed in edging apparatus 10 would cut by means of the longitudinal edge, or turn, of blades 124.

An exhaust system is preferably provided for removing chips. The exhaust system includes an opening 108 provided under cutter 50 and a length of piping 110 connected to a vacuum source (not shown). The vacuum draws chips of material as they are cut through opening 108 into piping 110 for deposit in a waste container (not shown). The exhaust system keeps the area around the edging apparatus 10 clean for the safety of the person using the machine and clear of any chips which would interfere with the processing of the material.

In use, a piece of plexiglass would be cut on a table saw or panel saw to the approximate desired size. The piece is then placed flat on the table 12 of edging apparatus 10 with an edge butted against the inset zone 88 on lead portion 82. The plexiglass piece is pushed by hand past the cutter 50. As the leading edge of the piece of plexiglass passes cutter 50, it is cut by the face 120 of blades 124. The leading edge then abuts take-up portion 84 and rolls under drive wheel 36, pushing drive wheel 36 up. The bar 58 pivots at pivot point 62. Spring 64 stretches and maintains tension on wheel 36 to keep it biased downwardly against the plexiglass piece on table 12. The drive wheel 36 rotates in a counterclockwise direction to pull the plexiglass piece forward along the fence 80. When end 55 of bar 58 moves down as end 53 and drive wheel 36 are pushed up, sprocket 30 which is mounted on block 33 on the top edge of bar 58 pulls on chain 28 causing bar 38 to slide forward. Spring 42 is stretched but maintains a bias on bar 38 to keep chain 28 tight.

Chips cut from the plexiglass piece are exhausted through piping 110. Each edge of a piece of plexiglass may be passed through the eding apparatus in the manner described one or more times as desired. Following the edging operation, the edges of the plexiglass are buffed in the usual manner.

The time required to edge a piece of plexiglass with the edging apparatus 10 of the present invention is half that required to edge using the manual scraping and sanding method of the prior art. The edging apparatus 10 is easy to use and employs standard motors, cutters and other components so that any part can be easily and inexpensively replaced when worn. Only single-phase power is required. More importantly, the accuracy of the edging operation is improved over edging machines heretofore available which cut on the vertical plane. Alignment of the plexiglass against the fence 80 is easy to achieve and maintain due to the ability to cut on a horizontal plane. A true 90° relationship is maintained between the edge and face of the material being cut. In addition, the quality of the cut provided by the face 120 of cutter blades 124 is particularly good. A smooth surface is provided which removes the rough cut saw marks and requires only a pass over a buffing wheel to provide a finished plexiglass piece.

What is claimed is:

1. An apparatus for edging material wherein the material is comprised of a rigid sheet of a predetermined range of thicknesses having at least one straight edge, said apparatus comprising:

a material support surface lying in a plane;

a cutter, said cutter having a longitudinal axis lying in a plane parallel to and spaced from the plane of said support surface and a plurality of adjacent blades for rotating about said axis, each blade having a facing edge which lies in a plane generally perpendicular to the plane of said longitudinal axis;

means for rotating said cutter about said axis; and guide means for guiding and aligning material relative to said cutter when at least one straight edge of the material is abutted against said guide means, said guide means having a lead portion, a take-up portion, and a window disposed between said lead and take-up portions for receiving said cutter, said lead portion having a zone adjacent said support surface stepped in relative to said take-up portion such that said zone lies in a plane parallel to but spaced from the plane of said take-up portion, said cutter being positioned in said window such that said facing edges of said cutter are generally coplanar to the plane of said take-up portion, and said zone and take-up portion planes are perpendicular to the plane of said support surface, the dimension of the space between said zone plane and said take-up plane being that of a predetermined depth of cut of material passed over said support surface along said guide means from said lead portion past said facing edges of said blades of said cutter to said take-up portion.

2. The apparatus recited in claim 1 further comprising means for automatically passing material of a predetermined range of thicknesses over said support surface along said guide means in a direction from said lead portion past said facing edges of said blades of said cutter to said take-up portion.

3. The apparatus recited in claim 2 wherein said automatic passing means comprises:

a motor;

a drive wheel;

a member pivotally mounted to said take-up portion of said guide means at a pivot point and having a front end on which said drive wheel is mounted and a rear end;

a spring mounted on said rear end of said member for biasing said front end and said drive wheel toward said support surface; and means for operatively connecting said motor to said drive wheel so that rotating forces generated by said motor are translated to said drive wheel.

4. The apparatus recited in claim 3 wherein said means for connecting said motor to said drive wheel comprises:

first sprocket means rotatably connected to said motor;

second sprocket means rotatably mounted on said member between said rear end and said pivot point;

third sprocket means rotatably mounted adjacent said drive wheel such that rotation of said third sprocket means rotates said drive wheel;

first means for operatively connecting said first sprocket means to said second sprocket means;

second means for operatively connecting said second sprocket means to said third sprocket means; and idler means for operative cooperation with said first and second connecting means;

wherein operation of said motor is translated through rotation of said first sprocket to rotation of said second sprocket through said first connecting means and through rotation of said second sprocket to rotation of said third sprocket through said second connecting means and through said third sprocket to rotation of said drive wheel such that material passed under said drive wheel is drawn by rotation of said drive wheel over said support surface.

5. The apparatus recited in claim 1 further comprising means for moving said cutter linearly along the line of said longitudinal axis.

6. The apparatus recited in claim 1 wherein said cutter rotating means comprises a motor having a rotating shaft on which said cutter is mounted in a coaxial relationship relative to said longitudinal axis of said cutter.

7. The apparatus recited in claim 6 further comprising means for moving said motor and said cutter linearly along the line of the axis of said shaft and said cutter.

8. The apparatus recited in claim 1 wherein the plane of said support surface is horizontal.

* * * * *

UNITED STATES PATENT AND TRADEMARK OFFICE
CERTIFICATE OF CORRECTION

PATENT NO. : 4,989,653

DATED : Feb. 5, 1991

INVENTOR(S) : Philip A. Angus

It is certified that error appears in the above-identified patent and that said Letters Patent is hereby corrected as shown below:

Col. 4, line 10, delete "C1-1k" and substitute --C1 - 1 1/2-- therefor.

Signed and Sealed this

Thirtieth Day of June, 1992

Attest:

DOUGLAS B. COMER

*Attesting Officer*   *Acting Commissioner of Patents and Trademarks*